Patented Oct. 6, 1953

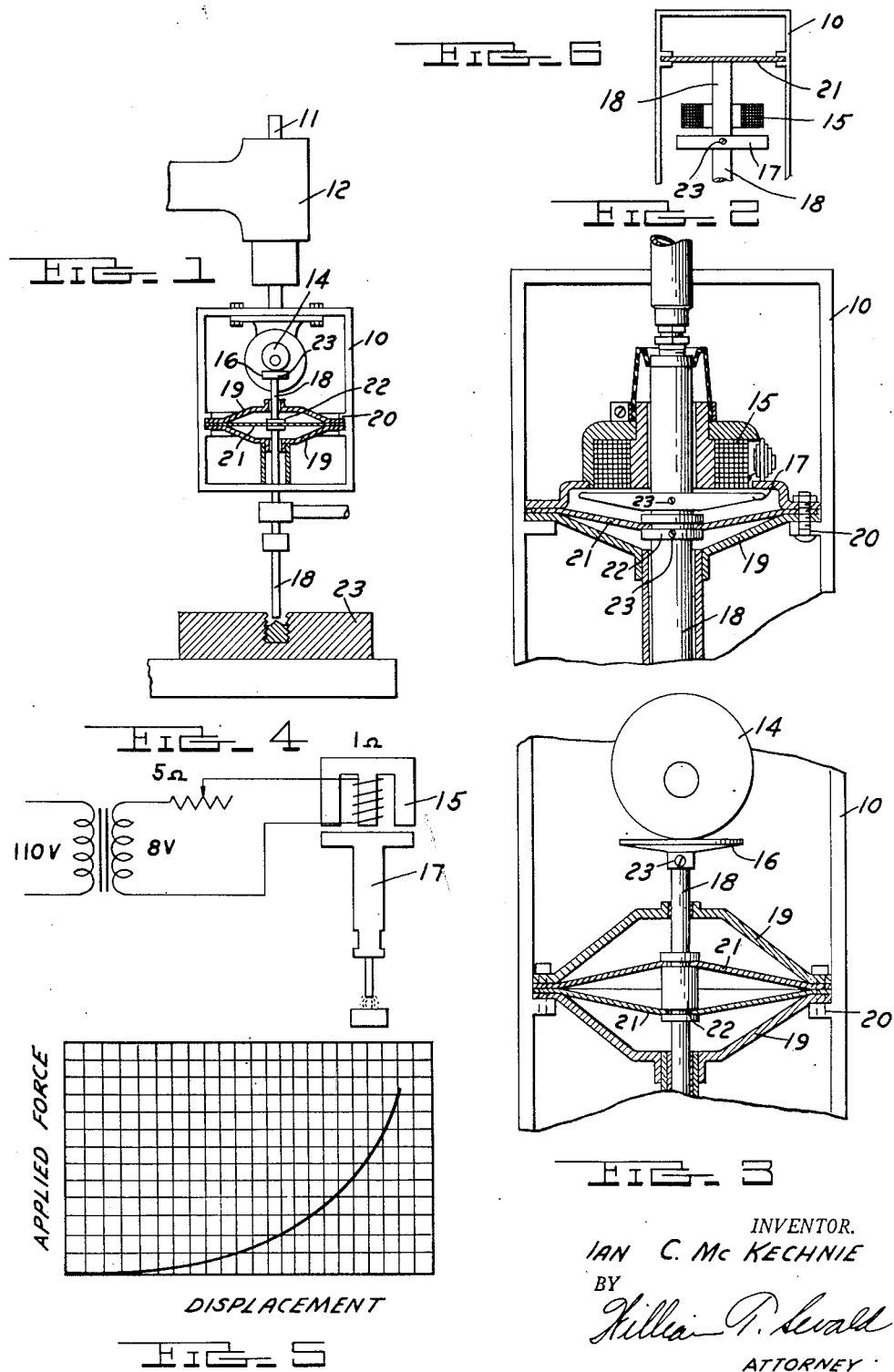

2,654,256

UNITED STATES PATENT OFFICE 2,654,256

DIAPHRAGM SPRING RECIPROCATING TOOL

Ian C. McKechnie, Detroit, Mich., assignor to Elox Corporation of Michigan, a corporation of Michigan Application August 23, 1950, Serial No. 181,054

3 Claims. (Cl. 74—55)

This invention relates to a rapidly reciprocating or vibrating tool or electrode and particularly to a disc or diaphragm spring used in conjunction therewith to facilitate adjusting the mechanism to the force applied to cause the vibration so that desirable amplitude and phase relation characteristics result.

A specific application of the invention is in conjunction with metal disintegrators of the type shown in the patent to Harding, 2,441,319, and in the patent to McKechnie, 2,501,945, wherein a rapidly reciprocated electrode is positioned relative to a workpiece for making and breaking an electrical arc between the electrode and the workpiece in the presence of a coolant for disintegrating a definite area in the workpiece to form an orifice therein.

In this connection it will be noted that Harding uses a cam 31 in conjunction with a coil spring 35 to effect rapid reciprocation of the electrode 55 while McKechnie uses a magnet 26 and a body 28 in conjunction with a coil spring 44 for rapidly reciprocating the electrode 50. In use these devices have proven difficult to phase and adjust due to springs displacing and deforming uniformly in conjunction with the applied force or load so that adjustment between the end of the vibrating electrode and the workpiece is faulty resulting in the electrode's either being too far away from the workpiece in weak-arcing relation therewith or being too close to the workpiece in welded relation thereto. In other words, it has been extremely difficult to adjust the vibrating electrode relative to the workpiece so that it will arc a certain length and not weld due to the deformation and displacement of the coil springs being proportional to the applied force which renders the device too resilient to transmit "feel" to an operator or a sensing mechanism such as a servomotor.

It is, therefore, a primary object of the invention to provide a spring for a vibrating tool capable of transmitting "feel" so that the electrode can be accurately adjusted relative to a workpiece to strongly arc and not weld.

An object of the invention is to provide a disc or diaphragm spring for a vibrating electrode.

An object of the invention is to provide a spring which is adjustable to the applied force to obtain desirable phase-relation and amplitude to effect proper arc-length to facilitate dimensional control of the area disintegrated in a workpiece.

An object of the invention is to provide a spring which is capable of being pre-loaded to effect determinable vibration to insure proper arc-length.

These and other objects of the invention will become apparent by reference to the following description of the disc or diaphram spring embodying the invention taken in conjunction with the attached drawing, in which:

Fig. 1 is a side elevational view, partly in a cross-section, of a disintegrator employing a single, flat, diaphragm or discular spring in conjunction with mechanical applied force.

Fig. 2 is a partial side elevational view, partly in cross-section, of a disintegrator embodying a single diaphragm or discular spring in conjunction with electrical applied force.

Fig. 3 is a partial side elevational view, partly in cross-section, of a disintegrator embodying two diaphragm or discular springs pre-loaded in opposed relation.

Fig. 4 is a wiring diagram of a circuit suitable for use in conjunction with the device shown in Fig. 2.

Fig. 5 is a graph showing the displacement of the inventive spring in relation to the applied force; and Fig. 6 is a view similar to Fig. 1 showing a like device in conjunction with electrical force.

Referring now to the drawing wherein like numerals refer to like and corresponding parts through the several views, the spring disclosed in conjunction with a vibrating electrode arc-disintegrator to illustrate the invention comprises an annular spring body having a central or axial opening, supports adjacent the external peripheral edge of the spring body, and a tool or electrode positioned in the axial opening of the spring body, and means for vibrating the electrode which consists of either a cam and wiping plate or a magnet and armature.

Relative to the vibrating means it will be noted that the force applied is down in the case of the cam and up in the case of the magnet necessitating adjusting the vibration of the electrode in conjunction with downward force at a point below the position of the end of the electrode as seen in Fig. 1 and adjusting the vibration of the electrode in conjunction with upward force at a point above the position of the end of the electrode as seen in Fig. 2 as the travel in Figs. 1 and 2 are to opposite extremities. In other words, the electrode will vibrate in relation to applied force and spring return between the point marking farthest travel and a point between the point marking farthest travel and the starting point due to lag in return in relation to the applied force.

More particularly the illustrated device comprises a frame 10, a rack 11 mounted in a supporting head 12 adapted to lower and elevate the frame 10, a driven cam 14 or a magnet 15, a wiping plate 16 or an armature 17, an electrode or electrode holder 18 mounted on the plate 16 or armature 17, guides 19 slidably positioning the electrode 18, supports 20 on the frame 10, adjustably associated or fixed thereon as desired, a diaphragm or discular spring body 21 having a central or axial aperture therein surrounding the electrode 18 mounted on the supports 20 adjacent its external periphery with the spring body 21 in supporting relation to the electrode 18 in the area thereof adjacent its central aperture by means of a bushing 22 or a direct connection, not shown. The bushing 22, the armature 17, the plate 16 are longitudinally movable via the set screw 23 relative to the electrode to adjust the applied force in relation to the spring body 21.

Obviously the cam 14, the magnet 15, and supports 20 can be longitudinally movably mounted relative to the wiping plate 16 and armature 17 to effect adjustment between the applied force and the spring body 21 or the power applied to the magnet 15 may be controlled and/or varied to effect adjustment between the applied force and the spring body 21. Fig. 4 shows suitable wiring for varying the power to the magnet 15 wherein a 110 volt transformer transmits 8 volts via a 5 ohm variable resistor with the magnet 15 having a winding of 1 ohm resistance. The speed of the cam 14 also is adjustable to suit the desired speed of electrode reciprocation.

To achieve stability of reciprocation or vibration, the mass, applied force, amplitude, natural frequency, applied frequency, damping factor, timing and phasing must be properly co-ordinated and adjusted to achieve optimum results. It has been found in the case of applying the force as seen in Fig. 2 the neutral point of vibration moves closer to the magnet whereas in the case of applying the force as seen in Fig. 1 the neutral point of vibration moves farther away from the cam. In the case of the magnet 15, this further increases its inductance and causes additional lag in the current flow over the normal in the magnet 15 which must be compensated by decreasing the resistance via the variable resistor to allow more current to flow or by the use of a resistor in the transformer primary or an adjustable transformer.

It is important, contrary to popular belief, that the vibration of the electrode, be damped to eliminate the spring body 21 vibrating at resonance as, when vibrating at resonance it is too easily thrown out of resonance resulting in phase displacement and amplitude reduction by the slightest amount of friction or obstruction rendering the tool unstable and consequently unusable, whereas an exceptionally stable vibration, lagging or leading the applied force, is obtained in damping the vibration of the spring body 21 by pre-loading one body 21 as seen in Fig. 3 with each body 21 initially displaced by the bushing or spacer 22. This double opposed spring body adaptation permits easy adjustment of head resonance frequency while retaining any desired amount of damping with the rate variably adjustable as desired by the width of the bushing or spacer 22 or by the thickness of the bodies effecting the overall range. This double opposed construction provides an extremely stable device both in amplitude vs. applied force as well as in phase relation vs. applied force in that the spring body 21 inherently has a force-displacement curve of the nature shown in Fig. 5. When the vibration is stable, the electrode 18 can be fed relative to the workpiece 23, Fig. 1, without distorting the vibration thereby providing "feel" for the operator or automatic feed so that determinable arc length can be obtained to facilitate dimensional control in disintegrating.

While the invention has been described in conjunction with the vibrating electrode of a metal disintegrator other uses of the inventive diaphragm or discular spring body can be devised by those skilled in the art such as in pneumatic and mechanical traumatic tools and it is obvious that many changes may be made in the size, shape, detail, and arrangement of the elements of the invention within the scope of the appended claims.

I claim:

1. In combination with a reciprocable tool, means for reciprocating said tool comprising resilient means mounting said tool and drive means operable to move said tool against the force of said resilient means, said resilient means comprising a pair of metallic diaphragm members mounted in coaxial relation with their peripheral portions fixed against movement, said members having axial apertures for receiving said tool, means for spacing said members axially at the centers thereof and means preventing axial movement of the tool relatively to said members.

2. The combination set forth in claim 1 wherein means is present for preloading the tool in one direction of reciprocation thereof.

3. In a vibrating tool mechanism, a tool adapted to be vibrated axially, means mounting said tool comprising a pair of metal diaphragm members fixed against movement at their peripheral portions, said members having aligned axial apertures for receiving said tool, means carried by said tool for spacing said members apart at their central portions and for fixing said tool against axial movement relatively to said members.

IAN C. McKECHNIE.

References Cited in the file of this patent

UNITED STATES PATENTS

| Number | Name | Date |
|---|---|---|
| 1,897,316 | Marshall | Feb. 14, 1933 |
| 2,162,719 | Hay | June 20, 1939 |
| 2,355,951 | Coffeen et al. | Aug. 15, 1944 |
| 2,383,382 | Harding | Aug. 21, 1945 |
| 2,399,977 | Bardos | May 7, 1946 |
| 2,432,717 | Berger | Dec. 16, 1947 |
| 2,441,319 | Harding | May 11, 1948 |
| 2,499,131 | Coles | Feb. 28, 1950 |
| 2,501,954 | McKechnie et al. | Mar. 28, 1950 |
| 2,539,439 | Kumler | Jan. 30, 1951 |